(12) United States Patent
Fox

(10) Patent No.: US 9,499,379 B2
(45) Date of Patent: Nov. 22, 2016

(54) TOWING ATTACHMENT

(71) Applicant: BRIONMADEL PTY LTD, Narellan (AU)

(72) Inventor: Michael Fox, Ingleburn (AU)

(73) Assignee: BRIONMADEL PTY LTD, Narellan (AU)

( * ) Notice: Subject to any disclaimer, the term of this patent is extended or adjusted under 35 U.S.C. 154(b) by 117 days.

(21) Appl. No.: 14/364,604

(22) PCT Filed: Dec. 11, 2012

(86) PCT No.: PCT/AU2012/001513
§ 371 (c)(1),
(2) Date: Jun. 11, 2014

(87) PCT Pub. No.: WO2013/086563
PCT Pub. Date: Jun. 20, 2013

(65) Prior Publication Data
US 2014/0341688 A1    Nov. 20, 2014

(30) Foreign Application Priority Data

Dec. 12, 2011    (AU) .................. 2011253974

(51) Int. Cl.
B60P 1/52       (2006.01)
B66F 9/075     (2006.01)
B60D 1/52      (2006.01)
B60D 1/00      (2006.01)

(52) U.S. Cl.
CPC ............. *B66F 9/07504* (2013.01); *B60D 1/52* (2013.01); *B60D 2001/008* (2013.01)

(58) Field of Classification Search
CPC ................. B60D 2001/008; B66F 9/0754
See application file for complete search history.

(56) References Cited

U.S. PATENT DOCUMENTS 2,772,918  A  * 12/1956  Klinger ................. B60P 1/08
                                                 280/492
2,777,713  A  *  1/1957  Parker .................. B62D 53/065
                                                 254/420
2,809,759  A    10/1957  Manker
(Continued)

FOREIGN PATENT DOCUMENTS

CN       101327902 A    12/2008
DE        8715730 U1     2/1988
(Continued)

OTHER PUBLICATIONS

Examination Report issued under Application No. AU2011253974 on Jul. 18, 2014.
(Continued)

*Primary Examiner* — James Keenan
(74) *Attorney, Agent, or Firm* — Colin P. Cahoon; Shaukat A. Karjeker; Carstens & Cahoon, LLP

(57) ABSTRACT

A towing attachment for a for a forklift is described. The towing attachment includes a main frame for locating the attachment on a fork assembly of a forklift, a towing hitch assembly on the main frame for connection to a towed article; and one or more connectors mounted on the main frame for connecting the main frame to a forklift body or forklift chassis wherein the one or more connectors are adapted to transfer towing forces on the towing attachment to the forklift body or forklift chassis.

14 Claims, 3 Drawing Sheets

(56) References Cited

U.S. PATENT DOCUMENTS

| | | | | |
|---|---|---|---|---|
| 3,250,506 A | * | 5/1966 | Thouvenelle | B62D 49/007 |
| | | | | 280/425.1 |
| 3,258,146 A | | 6/1966 | Hamilton | |
| 3,415,339 A | | 12/1968 | Range | |
| 3,587,893 A | | 6/1971 | Laken | |
| 3,881,619 A | * | 5/1975 | Morris | B66F 9/12 |
| | | | | 188/67 |
| 4,111,452 A | * | 9/1978 | Carlsson | B60T 17/04 |
| | | | | 280/421 |
| 4,287,966 A | * | 9/1981 | Frees | B66F 9/07504 |
| | | | | 180/14.1 |
| 4,997,013 A | * | 3/1991 | Peckels | B67C 11/02 |
| | | | | 116/109 |
| 5,236,299 A | * | 8/1993 | Oskam | B66F 9/18 |
| | | | | 414/608 |
| 5,497,569 A | * | 3/1996 | Byman | E02F 3/815 |
| | | | | 15/245 |
| 5,575,604 A | * | 11/1996 | Dubosh | B66F 9/07563 |
| | | | | 414/462 |
| 5,653,569 A | * | 8/1997 | Sears | B66F 9/149 |
| | | | | 414/607 |
| 5,692,583 A | * | 12/1997 | Reed | B66F 9/12 |
| | | | | 187/237 |
| 6,135,701 A | | 10/2000 | Galloway, Sr. | |
| 6,467,789 B1 | * | 10/2002 | Schedler | B60D 1/00 |
| | | | | 280/408 |
| 8,864,164 B2 | * | 10/2014 | Weiss | B66F 9/07504 |
| | | | | 280/415.1 |
| 2008/0073872 A1 | * | 3/2008 | Scott | B60D 1/075 |
| | | | | 280/477 |
| 2009/0020369 A1 | | 1/2009 | Warachka | |

FOREIGN PATENT DOCUMENTS

| | | |
|---|---|---|
| DE | 102007051953 A1 | 5/2009 |
| WO | 2004050533 A1 | 6/2004 |

OTHER PUBLICATIONS

PCT Search Report with Written Opinion for PCT/AU2012/001513 issued on Jan. 14, 2013.

EP Search Report dated Aug. 11, 2015 for Application No. 12856957.1 (7 pages).

* cited by examiner

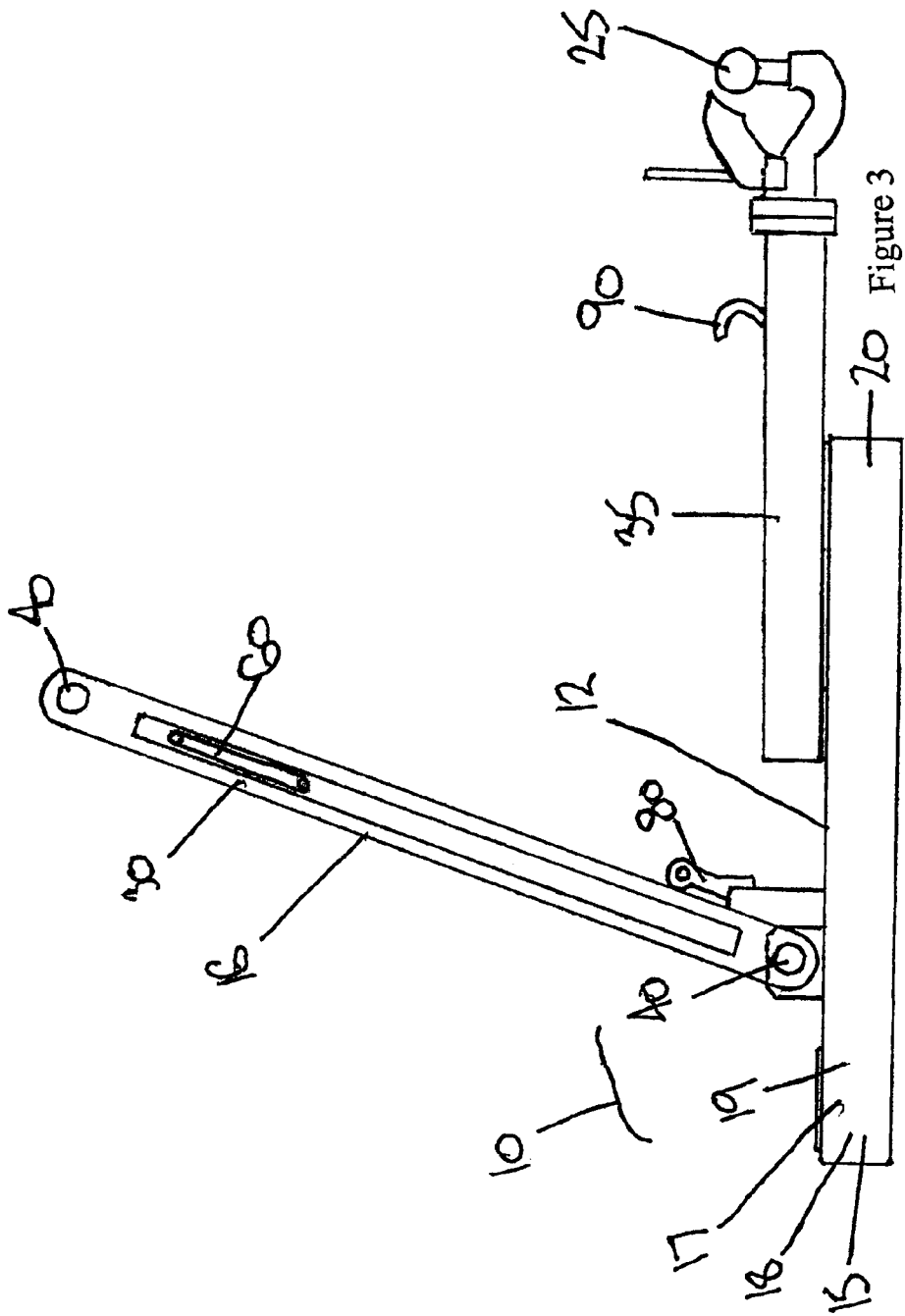

TOWING ATTACHMENT

FIELD OF THE INVENTION

The invention relates generally to a towing attachment operatively connectable to a forklift, the latter also known as a fork truck or lift truck. Hereinafter in this specification the term "forklift" will be used for convenience.

BACKGROUND OF THE INVENTION

Forklifts are often used to lift and transport stored articles around a warehouse or work site. Although the transporting of articles is intended only to be done while the article is held aloft on fork tines, often an article is towable, and the forklifts may conveniently perform a towing function to facilitate movement of the articles from place to place without lifting.

However, known towing devices for forklifts have disadvantages. Sometimes a tow ball is directly connected to a fork tine. This is a simple and cheap arrangement, but can tear the fork from its mount under certain loading conditions.

The tow ball may be mounted on a frame, in an arrangement known as a jib. Known jibs are mounted on the fork tines and sometimes a retainer, in the form of a chain, is looped around a fork tine mounting frame for increased towing capacity. Although this is an improvement on the direct tow ball mounting method, the fork tine mounting frame can be torn away from the forklift or otherwise damaged when towing an article.

A tow ball may be connected directly to the rear of a forklift. This arrangement results in the forklift operator facing in the opposite direction to the towed article which can cause safety issues when towing an article.

In this specification, where a document, act or item of knowledge is referred to or discussed, this reference or discussion is not an admission that the document, act or item of knowledge or any combination thereof was at the priority date:

(a) part of common general knowledge; or
(b) known to be relevant to an attempt to solve any problem with which this specification is concerned.

The present invention seeks to provide a useful alternative to known towing attachments for forklifts and seeks to provide a new towing attachment for a forklift.

SUMMARY OF THE INVENTION

According to one aspect of the present invention there is provided a towing attachment for a forklift, the attachment including:

a main frame for locating the attachment on a fork assembly of a forklift;

a towing hitch assembly on the main frame for connection to a towed article; and one or more connectors mounted on the main frame for connecting the main frame to a forklift body or forklift chassis wherein the one or more connectors are configured to transfer towing forces on the towing attachment to the forklift body or forklift chassis.

Preferably the towing attachment further includes pivot receivers for mounting on the forklift body or chassis, the pivot receivers for receiving the connectors.

The arrangement is such that in use, towing forces, in particular fore-and-aft towing forces, on the towing attachment are transferred to the forklift body or chassis and not transferred to the fork assembly. The transfer of towing forces into the fork assembly, particularly fore-and-aft towing forces, should be minimised as they may tear the fork assembly from the fork chassis if they are high enough or at a high enough angle from fore-and-aft. The arrangement of preferred embodiments is also such that the towing attachment facilitates towing of a variety of towed articles at a variety of towing heights. Preferred embodiments also are arranged so that the main frame is slidably mounted on the forks to allow fore-and-aft movement, thus facilitating transfer of towing forces from the forks and fork assembly to the connectors and into the chassis.

The fork assembly of a forklift typically includes a lifting apparatus and a fork assembly, the latter of which is usually in the form of two tines for supporting articles during lifting and transporting from place to place. The fork assembly usually also includes adjustment apparatus such that the tines may be extended, retracted, raised and lowered. Also, the tines may be separated from one another and brought closer to one another.

The chassis of forklifts also typically includes body elements and chassis members.

Optionally each of the one or more connectors include a link element which is mounted between the main frame and the forklift body or forklift chassis. Preferably the one or more link elements are, in a towing position, operatively mounted to the main frame and the forklift body or chassis. Preferably the link elements are articulated link elements such that they facilitate relative movement, and in particular, relative vertical movement, between the tines and the chassis. Preferably pivots are provided at ends of each link to facilitate articulation of the link elements when in use and in a towing position and for connection to the pivot receivers on the chassis.

Optionally each of the one or more link elements is a rigid arm so that in use, pushing and pulling or fore-and-aft forces may be transferred along the rigid arm into the forklift chassis. Each rigid arm preferably further includes an elbow so as to accommodate the width of the fork assembly.

Optionally each link element includes a handle to facilitate an operator raising or lowering the arm between the towing and stowed positions.

Optionally there are provided catches for receiving and retaining the links in a stowed position. The catches are automatically operated in that they are disposed in a free or open position until the link is brought into the stowed position at which time the catch extends into a locked position.

Preferably there is provided a pivot receiver on the forklift chassis for receiving the pivot extending from the link.

Preferably the links adopt the stowed position when they are in a generally vertical position and are moved between that stowed position and a towing position by pivoting the links about a pivot mounted on the main frame.

Optionally the towing attachment includes a height gauge. The height gauge may include an indicator in the form of a pin mounted in a hollow tube, the tube mounted at a distal end of a tube mounting arm mounted on one link element. The pin normally hangs downwardly from the tube and is retained in the tube by flanges extending generally radially outwardly from the pin at both ends. The tube is held on the tube mounting arm such that the pin is disposed above a main frame element. In use, when the towing attachment is elevated to a selected position, the main frame element contacts one end of the pin. During elevation of the main frame, the pin emerges from the upper end of the tube, indicating to the operator that the towing attachment is at a height suitable for towing. The pin is a selected length so that, when it reaches the end of its stroke, it provides an indication as to maximum height of the main frame.

Optionally there is provided a chain hook for receiving a safety chain from the towed article. Preferably the chain hook is provided on the cross member.

The main frame of the towing attachment may include frame elements. The frame elements may be in the form of one or more tine mount elements which may be in the form of one or more tine receiving elements. The one or more tine receiving elements may be in the form of one or more hollow tube members, preferably in the form of rectangular hollow section elements, preferably constructed from steel. The hollow tube members facilitate relative movement between the main frame and the tine.

The tine mount elements may be in the form of location lugs or slides, channels, angles or other suitable receivers for receiving tine mounts.

Optionally the frame elements include one or more cross members connected to the one or more tine mounting elements and extend therefrom. When two tine mounting elements are provided, the cross members are connected to the tine mounting elements so as to extend therebetween.

The towing hitch assembly preferably includes a tow ball or a recess adapted to receive a tow ball mount. The tow ball and tow ball mount preferably provided are preferably commercial off-the-shelf items, their various options of structure and operation being well known and described in other publications and manufacturer catalogues.

The towing hitch is preferably mounted on a support beam, which is mounted to at least one of the cross members in a suitable position facilitating connection with a cooperating tow ball receiver on a towed article.

In accordance with a second aspect of the present invention, there is provided a towing attachment for a forklift, the towing attachment including a main frame including forklift tine receiving elements, a towing hitch assembly mounted on the main frame, and two articulated steel link members which are pivotally mounted to the main frame at one end and pivotally mountable to a forklift chassis or forklift body at the other end, wherein in use any towing force on the towing attachment is transferred to the forklift body or a forklift chassis.

DESCRIPTION OF THE DRAWINGS

The invention will now be further explained, for the purposes of enabling a clearer understanding, by reference to the accompanying drawings in which:

FIG. 3 is a side elevation view of the towing attachment of FIG. 1 shown in a stowed or standby position.

DETAILED DESCRIPTION OF A PREFERRED EMBODIMENT

Figure 1:
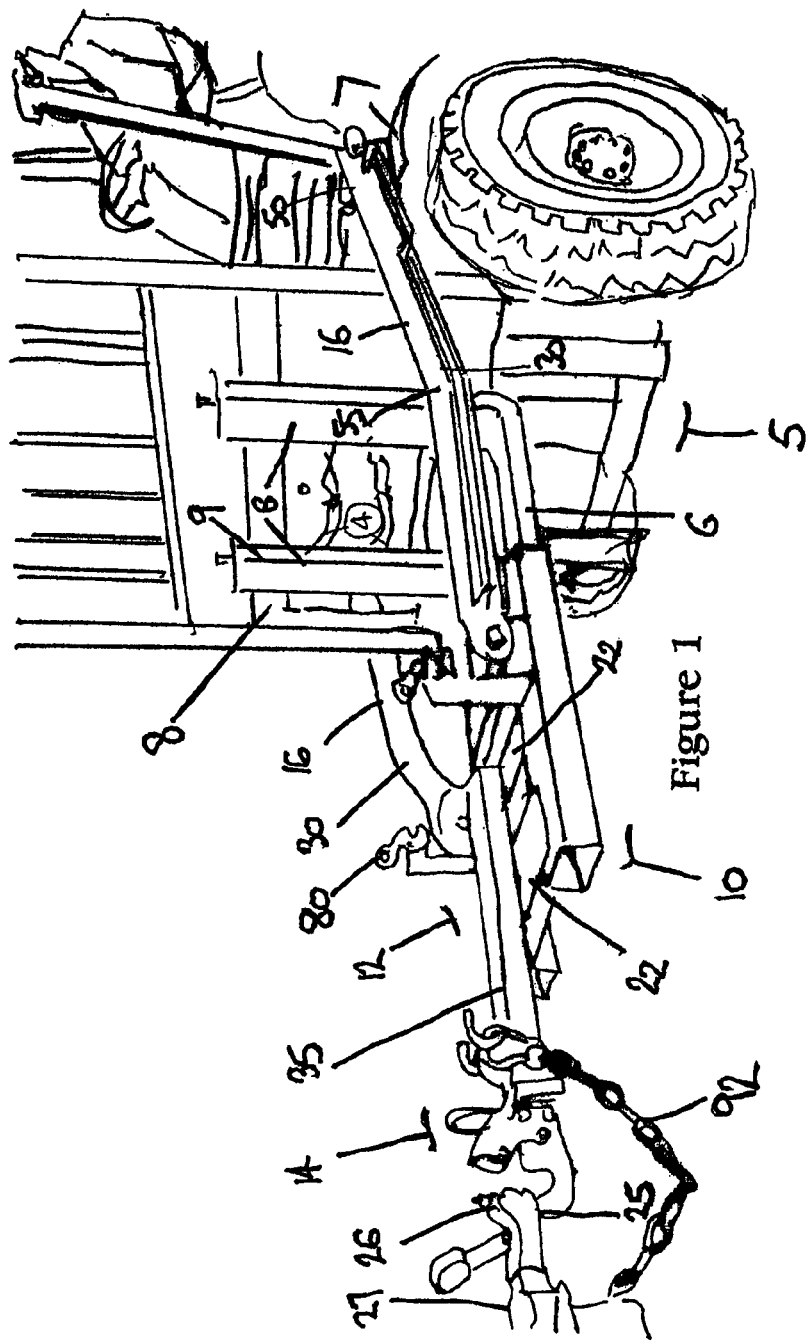
FIG. 1 is a perspective view of a forklift and towing attachment in a towing position thereon, the towing attachment being according to one preferred embodiment of the invention.

Referring to the drawings there is shown a towing attachment generally indicated at 10, the towing attachment 10 being suitable for attachment to a forklift 5 having a forklift body, a forklift chassis (both indicated by 7) and a fork assembly 8. The towing attachment 10 includes a main frame 12 for mounting on the fork assembly 8 and a towing hitch 14 mounted on the main frame 12. Further included in the towing attachment 10 is one or more connectors 16 mounted on the main frame 12 for connecting the main frame 12 to the forklift body or forklift chassis 7.

The fork assembly 8 includes a lifting apparatus and a fork 9 which is in the form of a plurality of tines 6 for supporting articles during lifting and transporting from place to place. The fork assembly 8 includes adjustment apparatus 4 such that the tines 9 may in use be extended and retracted, as well as separated from one another and brought closer to one another.

The forklift body or forklift chassis 7 includes body elements and chassis members (not shown).

The main frame 12 of the towing attachment 10 includes frame elements 15. The frame elements 15 are in the form of two tine mount elements 17 which are in the form of two tine receiving elements 18. The tine receiving elements are in the form of hollow tube members 19, preferably in the form of rectangular hollow section elements 20, constructed from steel. The hollow tube members 19 facilitate relative movement between the main frame 12 and the tines 6 and allow fore-and-aft sliding between the frame and the fork assembly so that fore-and-aft towing forces are not transferred to the fork tines or fork assembly.

The frame elements 15 include two cross members 22 connected to the tine mount elements 17 and extend therefrom. The cross members 22 are connected to the tine mounting elements 17 so as to extend therebetween.

The towing hitch 14 includes a tow ball 25 but may include a recess adapted to receive a tow ball mount. The tow ball and tow ball mount provided are commercial off-the-shelf items and are not proposed to be described in detail in this specification, their various options of structure and operation being well known and described in other publications and manufacturer catalogues.

The towing hitch 14 is mounted on an end of a support beam 35 which in turn is mounted on one of the cross members 22 in a suitable position facilitating connection with a cooperating tow ball receiver 26 on a towed article 27.

Each of the connectors 16 include a link element 30 which is mounted between the main frame 12 and the forklift body or forklift chassis 7. The one or more link elements 30 are operatively mounted to the main frame and the forklift body or forklift chassis 7. The link elements 30 are articulated link elements such that they facilitate relative movement, and in particular, relative vertical movement, between the tines and the forklift chassis. Pivots 40 are provided at ends of each link 30 to facilitate articulation of the link elements 30. The pivots 40 are retractable and in use, to enter a towing position, the pivots extend into a pivot receiver 50 on the forklift body or chassis 7 for receiving the pivot 40 extending from the link 30.

Each of the two link elements 30 is an arm so that pushing and pulling forces are transferred into the forklift body or chassis 7. Each arm further includes an elbow 55 so as to accommodate the width of the forklift 5. Each link element 30 includes a handle 60 to facilitate an operator raising or lowering the arm.

The towing attachment 10 includes a height gauge 70. The height gauge 70 includes an indicator 72 in the form of a pin 74 mounted in a hollow tube 76, the tube 76 mounted at a distal end of a tube mounting arm 78 mounted on one link element 30. The pin 74 normally hangs downwardly from the tube 76 and is retained in the tube by flanges 79 extending generally radially outwardly from the pin at both ends. The tube 76 is held on the tube mounting arm 78 such that the pin 2 is disposed above any one of the main frame elements—in this case being a cross member. In use, when the towing attachment 10 is elevated up to a selected position, the main frame element contacts one end of the pin 74. During further elevation of the main frame 12, the pin 74 emerges from the upper end of the tube, indicating to the operator that the towing attachment 10 is at a height suitable for towing. The pin 74 is a selected length so that, when it reaches the end of its stroke, it provides an indication as to maximum height of the main frame 12.

There are provided catches 80 for receiving and retaining the links 30 in a stowed position. The catches 80 are automatically operated in that they are disposed in a free or open position until the link 30 is brought into the stowed position (FIGS. 2 and 3) at which time the catch extends into a locked position.

There is also provided a chain hook 90 for receiving a safety chain 92 from the towed article 27. The chain hook 90 is provided on the tow hitch bar 35.

The links 30 adopt the stowed position when they are in a generally vertical position and are moved between that stowed position and a towing position by pivoting the links about a pivot mounted on the main frame.

Figure 2:
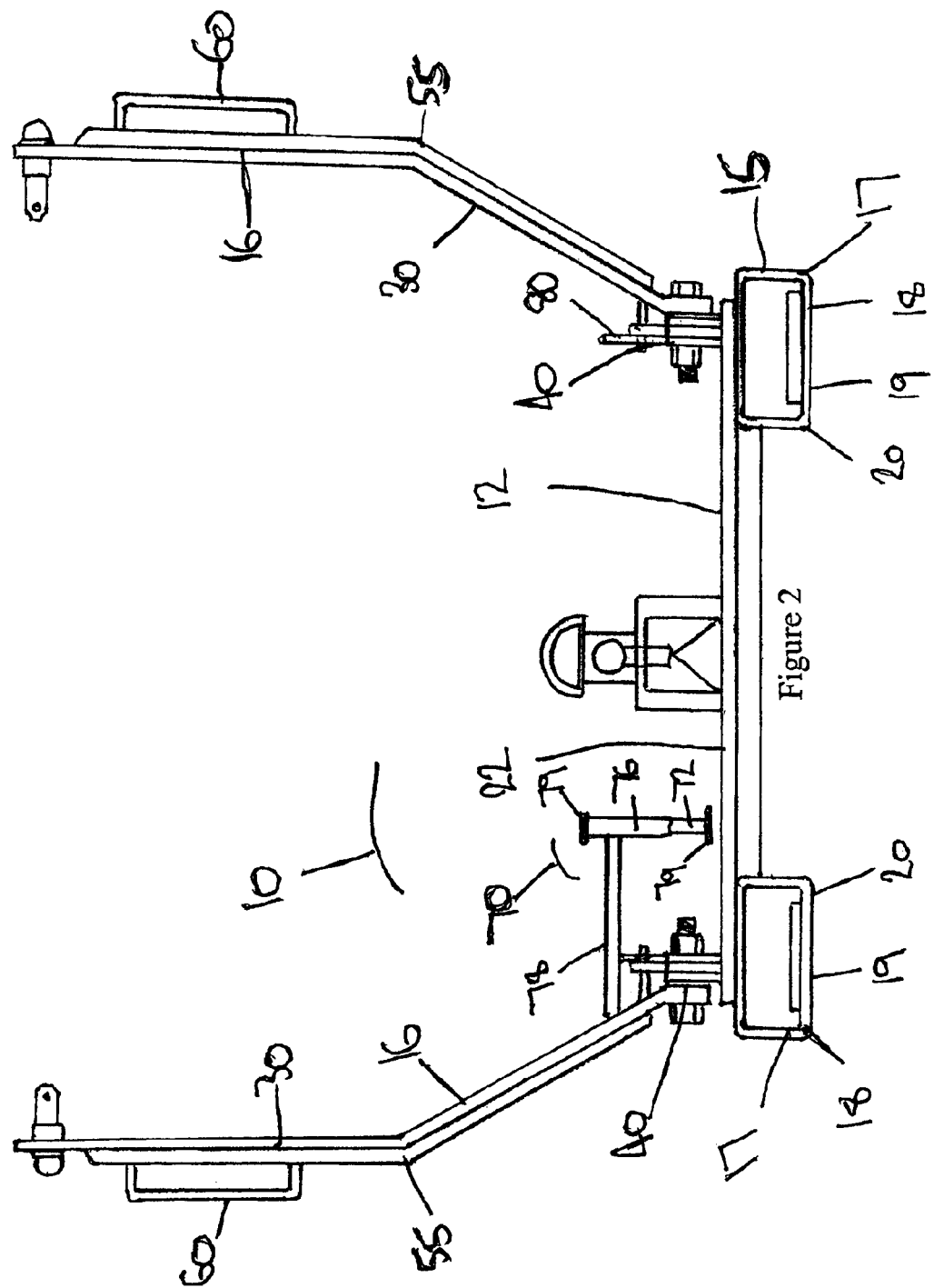
FIG. 2 is a front elevation view of the towing attachment of FIG. 1 shown in a stowed or standby position.

To operate, the forklift operator approaches the towing attachment 10, which is likely to be in the stowed or standby position (shown in FIGS. 2 and 3). The operator drives the forklift tines 6 into the rectangular hollow section elements (RHS) 20. The catches 80 are released into the free position so that the links 30 pivot into the towing position shown in FIG. 1. The pivots 40 are retracted and then extend into the pivot receivers mounted on the forklift body or chassis 7. The tines 6 are then raised, and the links 30 by that raising pivot about their pivoting ends to a flatter or more horizontal disposition relative to the main body 12. As the links 30 become more horizontal, the height gauge 70 is lowered on to the main body frame 12 until the pin 74 extends upwards. The towing attachment 10 is now disposed at a height range suitable for towing. The forklift 5 is driven to a towed article 27 and connected in the usual manner. The towing forces during the subsequent towing are transferred to the body or chassis of the forklift through the links 30, in part due to the RHS elements providing sliding movement along the tines so that there is no transmission of fore-and-aft towing forces along the fork tines or fork assembly. Those fore-and-aft forces are taken along the frame by the connectors, in preferred embodiments being links 30.

Advantageously the towing attachment in FIGS. 1-3 may be stored at ground level with the main frame in contact with the ground, the forklift may connect with the main frame and then connected to the forklift body or chassis and then elevated to any suitable towing height within a selected range. The adjustable nature of the towing height is one of the advantages of preferred embodiments of the invention.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

What is claimed is:

1. A towing system for a forklift having a forklift body or chassis, a fork lifting assembly mounted on the forklift body or chassis and having forks mounted on the fork lifting assembly, the towing system comprising:

a main frame comprising hollow members for receiving the forks to locate the main frame on the fork lifting assembly;

a towing hitch assembly on the main frame for connection to a towed article;

a pair of substantially rigid link elements for connecting the main frame to the forklift body or chassis for transferring pushing and pulling tow forces from the main frame to the forklift body or chassis, each one of the pair of substantially rigid link elements being pivotally mounted at one end on the main frame and configured to be pivotally mounted at the other end on the forklift body or chassis when the main frame is in a towing position, such that the towing forces bypass the forks and the fork lifting assembly; and a pair of pivot receivers, each one of the pair of pivot receivers configured to receive the other end of the substantially rigid link elements, the pair of pivot receivers being configured to mount on the forklift body or chassis.

2. The towing system in accordance with claim 1 wherein the link elements are articulated link elements to facilitate relative vertical movement between the forks and the chassis when in a towing position.

3. The towing system in accordance with claim 2 wherein pivots are provided at the ends of each substantially rigid link element to facilitate articulation of the link elements.

4. The towing system in accordance with claim 3 wherein each substantially rigid link element includes an elbow so as to accommodate the width of the fork assembly.

5. The towing system in accordance with claim 1 wherein each link element includes a handle to facilitate an operator raising or lowering the link elements.

6. The towing system in accordance with claim 1 wherein catches are provided for receiving and retaining the link elements in a stowed position.

7. The towing system in accordance with claim 6 wherein the catches are automatically operated to be disposed in a free or open position until the link is brought into the stowed position at which time the catch extends into a locked position.

8. The towing system in accordance with claim 1 wherein the towing attachment includes a height gauge.

9. The towing system in accordance with claim 8 wherein the height gauge includes an indicator in the form of a pin mounted in a hollow tube, the tube mounted at a distal end of a tube mounting arm mounted on one of the pair of substantially rigid link elements.

10. The towing system in accordance with claim 9 wherein the pin in normal use hangs downwardly from the tube and is retained in the tube by flanges extending generally radially outwardly from the pin at both ends.

11. The towing system in accordance with claim 9 wherein the tube is disposed on the tube mounting arm such that the pin is disposed above a main frame element.

12. The towing system in accordance with claim 1 wherein the hollow members for receiving the forks include hollow tube members for facilitating fore-and-aft movement between the forks and the main frame.

13. The towing system in accordance with claim 12 wherein the hollow tube members are in the form of rectangular hollow section elements.

14. The towing system in accordance with claim 1 wherein the towing hitch is mounted on an end of a support beam extending from the main frame.

\* \* \* \* \*